INVENTOR
EDWARD C. ASELMAN, JR.
BY
Robert J. Schaap
ATTORNEY

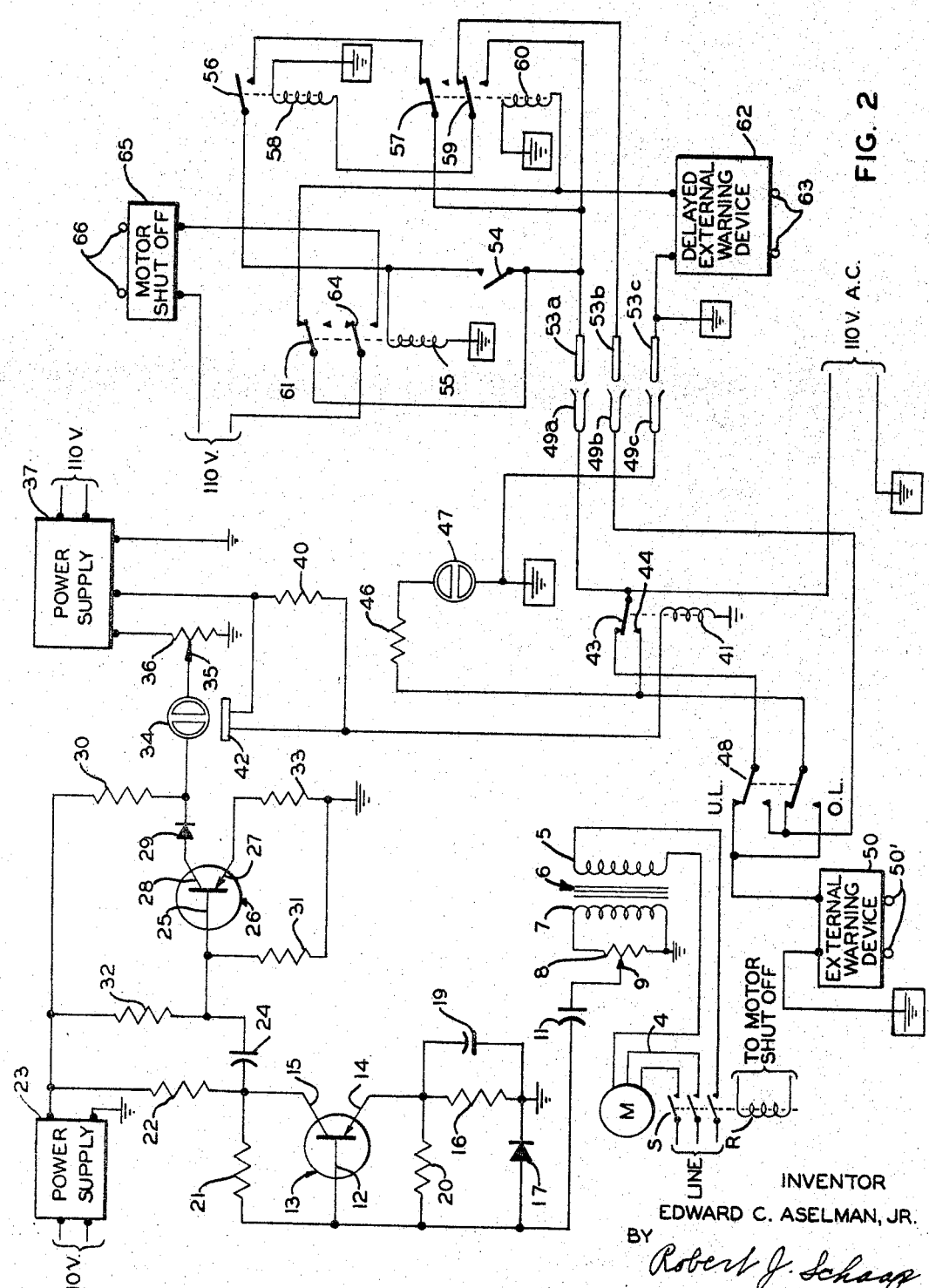

United States Patent Office 3,435,289
Patented Mar. 25, 1969

3,435,289
CONTROL APPARATUS FOR AN ELECTRICALLY OPERABLE DEVICE
Edward C. Aselman, Jr., Jefferson County, Mo., assignor to T.N.E. Incorporated, a corporation of Missouri
Filed Dec. 7, 1965, Ser. No. 516,206
Int. Cl. H02h 7/06, 7/08, 7/10
U.S. Cl. 317—13                               32 Claims

ABSTRACT OF THE DISCLOSURE

An electrical current sensor for operative connection to an electrical device such as a motor powered pump for sensing current input to the motor. The sensor includes a transformer to detect current input and an amplifier to increase the measured change in current level. The sensor produces an error signal when the current either falls below or exceeds a pre-established level, and a reference voltage signal for comparison with the error signal, in a summating circuit. A switch is connected to the summating circuit and causes energization of an alarm when the current input to the pump exceeds or falls below the pre-established value. An automatic disconnect device is optionally connected to the sensor and motor for automatically de-energizing the motor upon sensing of the undesirable current level.

---

Figure 1:
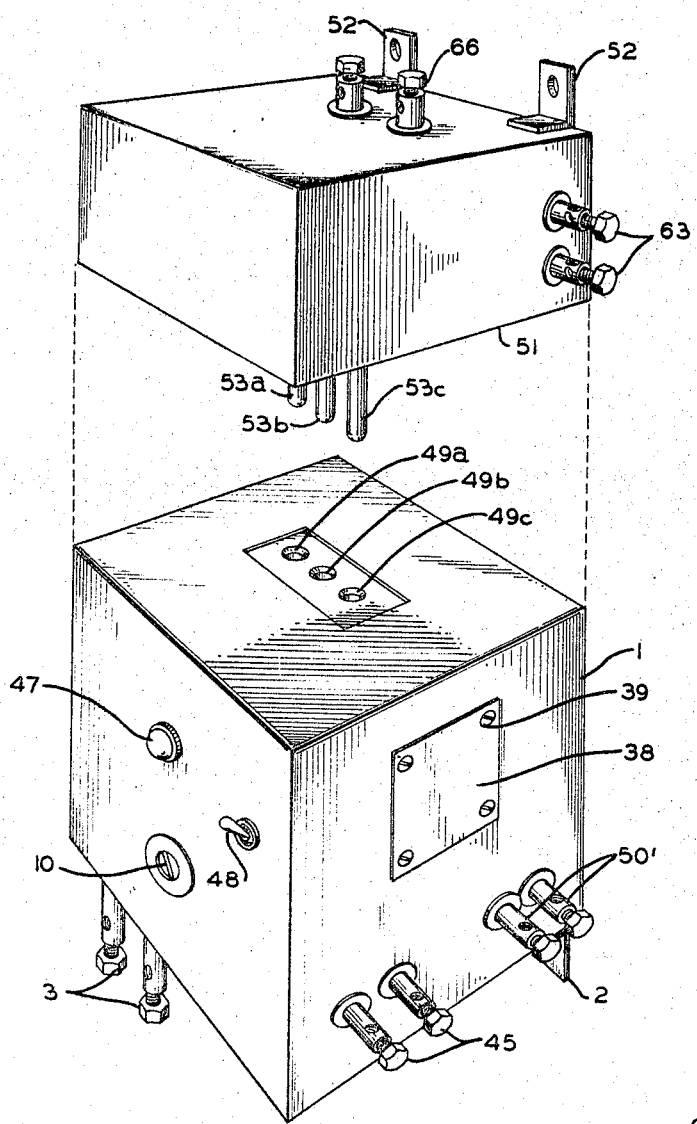

This invention relates in general to certain new and useful improvements to an electrical control apparatus and more particularly, to an apparatus for detecting a small change in the power requirements of an electrically operable device.

There has been a long standing need for an efficient and accurate apparatus for detecting changes in power requirements to motors, pumps, and in general, any piece of equipment with an electrical drive, having variations in load requirements. This need is particularly exemplified by the problems encountered in pumping with industrial pumps. The modern industrial pump, such as in chemical processing industries, is a rather expensive piece of equipment and close fitted parts can be easily damaged when subjected to running under non-wetted conditions. On numerous occasions, the pump may be energized for pumping a selected quantity of fluid. During the time that fluid is passing through the pump, the motor which powers the pump is subjected to a load. In many cases, the fluid which passes through the pump often serves as a lubricant. If the quantity of fluid in the tank from which the pump is drawing its supply has become depleted, then a reduced load is imposed on the motor operating the pump. This type of situation can have a multitude of deleterious effects. The fluid which may serve as a lubricant to the pump no longer provides a lubricating function. Furthermore, a pump running under a no load condition may easily subject close fitted parts to excessive wear, leading to shortened life of the pump and the pump motor.

There have been various attempts to overcome this problem by using relays for sensing the change in the input requirements to the motors. However, relays are not sufficiently sensitive for small motors, and furthermore, are not capable of use with a multitude of various sized motors. Accordingly, devices which employ a relay as a primary sensing element for a pump or motor have not been very effective. These problems exist not only in the cases of pumps, but in many types of electrically operated equipment having variations in load requirements.

It is therefore the primary object of the present invention to provide an apparatus and method for detecting the changes in power requirements of an electrically operable control element and providing advisory signals responsive to the change in the load requirements on such elements.

It is another object of the present invention to provide an apparatus of the type stated which is adaptable for use with electrically operable equipment having a wide variety of power ranges.

It is an additional object of the present invention to provide an apparatus of the type stated which is highly sensitive and capable of detecting minute changes in input requirements in response to output requirements of an electrically operable device.

It is also an object of the present invention to provide an apparatus of the type stated which is capable of changing the input requirements to a controllable element when the output load conditions on said element achieves a preselected set point value.

It is another salient object of the present invention to provide an apparatus of the type stated which can be built in a relatively small compact unit and can be manufactured at a low cost.

With the above and other objects in view, my invention resides in the novel features of form, construction, arrangement, the combination of parts presently described and pointed out in the claims.

Figure 3:
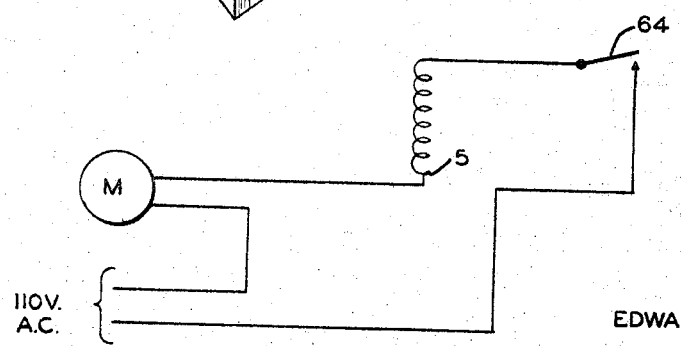

In the accompanying drawings:
FIGURE 1 is an exploded prospective view of an apparatus constructed in accordance with and embodying the present invention and showing an attachment for the apparatus in a disassembled position;
FIGURE 2 is a schematic view illustrating the electrical circuitry forming part of the apparatus of the present invention; and
FIGURE 3 is a schematic view showing a slight modification of the circuitry of FIGURE 2 when the apparatus of the present invention is used with a device having the same current input as the current on which the apparatus operates.

GENERAL DESCRIPTION

Generally speaking, the apparatus of the present invention is capable of detecting the variations in the output of an electrically operable element, such as an electrical motor by sensing changes to the input of the element. An attachment permits the changing of the input to the electrically operable element when the output achieves a certain set point value. The apparatus of the present invention is provided with leads for attachment to the input lines of the electrically operable device. The input leads are connected to a sensing element which includes a transformer. The secondary coil of the transformer is capable of detecting changes of current in the primary coil which in turn detects changes in the input requirements to the motor. This small voltage which is induced in the secondary coil of the transformer is then transmitted through a coupling capacitor to a transistorized network for amplifying the signal. This voltage is transmitted through another coupling capacitor to a second transistorized network which serves as a switching circuit. The second transistorized network also acts as a rectifier for changing available A.C. voltage to pulsating D.C. voltage. When the signal transmitted to the amplification circuit is of sufficient value, it will bias the transistor in a condition where the transistor permits current to pass therethrough in the form of a control signal.

This control signal which passes through the amplification circuit is combined with a reference voltage signal at a neon bulb which serves as a summating device. The reference voltage signal is provided by a power supply having a voltage regulator to insure a constant voltage output. The signal transmitted by the amplification circuitry is a negative signal and is added to the positive voltage signal from the power supply. When this combined reference signal and control signal reaches a certain value which is sufficient to energize the neon bulb, the neon bulb will light and change the resistance characteristics of a light sensitive transducer. The light sensitive transducer is connected in parallel with the power supply and is characterized by a reduction in resistance when subjected to the light from the neon bulb. This permits a voltage signal from the power supply to pass through the transducer, shunting a fixed resistor and energizing a relay coil. Thus, by adding parallel resistances, only a slight change in resistance of the transducer will create a sufficiently larger change of current available for the relay coil.

When the relay is energized, a switch which is operable thereby will provide current to an advisory light indicating that power requirements to the motor exceeds a preselected set point value. However, when the signal transmitted by the secondary coil through the amplification circuit and the switching circuit is not sufficient to light the neon bulb, the relay will not be energized. In this event, the switch operable thereby will complete a circuit to an external warning device advising that the load requirements in the motor has dropped below the preselected set point value. A sensitivity potentiometer is interposed between the sensing transformer and the amplification circuit for providing adaptation to a plurality of controllable elements having different input ranges. Furthermore, a set point potentiometer is interposed between the power supply and the neon light for adjusting the reference voltage signal to the light and thereby fixing the set point at which the neon light will be energized.

An attachment to the device previously described is also provided for automatically varying the input to the controllable element in response to changes in the output load requirements. This device is also partially operable by the relay and includes a time delay relay which is designed to delay the action of operatively disconnecting the input of the motor for a predetermined interval after an error signal in the output load requirements is detected. Furthermore, the apparatus includes a manually operated resetting relay for initiating the input to the motor after the same has been deenergized through the action of the automatic device.

The detection device which is capable of sensing the change in the output by measurement of the input signal, is provided wth a two-position switch for operating the device on both underload and overload conditions. Thus, when the switch is shifted to the underload position, the device will detect an output signal which falls below a predetermined set point value. In similar manner, when the switch is shifted to the overload position, the device will detect an output signal which exceeds a predetermined set point value.

DETAILED DESCRIPTION OF THE DETECTOR DEVICE

Referring now in more detail and by reference characters to the drawings which illustrate a preferred embodiment of the present invention, A designates an apparatus for detecting a change in the input requirements to an electrically operable device. The apparatus A is provided with an outer housing 1 having a pair of L-shaped mounting brackets 2 depending from the bottom face of the housing 1, substantially as illustrated in FIGURE 1. The brackets 2 can be secured to any convenient supporting structure and may be operatively mounted on or near the electrically operable element on which the apparatus A is used. On its underface, the housing 1 is provided with a pair of depending lugs 3 for operative connection to the input conductors 4 of an electrical motor M. In this connection, it should be understood that the apparatus A could be used with any suitable electrically operable device and the use thereof is not necessarily limited to electrical motors.

By reference to FIGURE 2, it can be seen that the lugs 3 are connected in series with one of the input conductors 4 to the motor M. The lugs 3 are in turn connected to the primary winding 5 of a step-up transformer 6, the latter also having a secondary winding 7. A sensitivity potentiometer 8 is connected in parallel with the secondary winding 7 of the transformer 6 and is provided with a movable element 9. The movable element 9 is in turn operable by a set screw 10 which is mounted on the front face of the housing 1. By employment of a set screw for adjustment of the potentiometer 8, unauthorized adjustment of the potentiometer 8 is substantially reduced.

The movable element 9 of the potentiometer 8 is connected to a coupling capacitor 11 which is in turn connected to the base 12 of a PNP transistor 13, the latter having an emitter 14 and a collector 15. The emitter 14 is connected through an emitter resistor 16 and a diode 17 to the common connection of the coupling capacitor 11 and the base 12, in the manner as illustrated in FIGURE 2. The emitter resistor 16 is designed to limit the amount of current through the emitter 14 and provides a bias for the operating point of the transistor 13, thus stabilizing this portion of the transistorized network. It is desirable to provide a large emitter resistor for greater stability.

An emitter capacitor 19 is connected across the emitter resistor 16 and is designed to prevent degeneration of the emitter 14 in the transistor 13. The capacitor 19 also increases the frequency response of the transistor 13 and thereby increases the overall gain at a 60 cycle low frequency voltage, which is supplied to the circuit. The secondary 7 of the transformer 6 and the emitter capacitor 19 and the emitter resistor 16 are all provided with A.C. grounds in the manner as illustrated in FIGURE 2. The diode 17 in the emitter portion of the circuit serves as a temperature compensating device. The diode 17 exhibits a negative temperature coefficient of resistance and when used in conjunction with the emitter resistor 16 having zero or a positive temperature coefficient, it is possible to compensate for a change in temperature. A voltage dividing network, consisting of fixed resistors 20, 21 is connected across the emitter and capacitor of the transistor 13 and has a common junction connected to the base of the transistor 13. This voltage divider network is provided so that the base 12 of the transistor 13 is negative with respect to the emitter 14 in the transistor 13. The collector 15 is provided with a collector resistor 22 which is in turn connected to the output of a 110 volt alternating current regulated power supply 23. The resistor 22 is designed to develop the A.C. power signal for the transistor 13. Furthermore, the resistor 22 will provide a voltage change on the collector 15 proportional to a current change in the transistor 13. Thus, by means of the above outlined construction, it can be seen that the transistorized network containing the transistor 13 serves as an amplifying circuit, and is designed to amplify a signal produced in the secondary coil 7 of the transformer 6.

The collector 15 of the transistor 13 is connected through a coupling capacitor 24 to the base 25 of a second PNP transistor 26, the latter also having an emitter 27 and a collector 28. The collector 28 is also connected to a diode 29, a collector resistor 30, to the power supply 23. The presence of the resistor 30 provides a voltage on the collector 28 which is proportional to the current passing through the transistor 26. A voltage dividing network consisting of fixed resistors 31, 32 is connected from the power supply 23 to ground and the common terminal of the resistors 31, 32 is connected to the base 25 of the transistor 26. Furthermore, the emitter 27 is provided with a ground in the manner as illustrated in FIGURE 2.

The voltage divider network for the transistor 26 serves the same purpose as the voltage divider network for the transistor 13. However, the collector resistor 30 in the second transistorized network, also serves as a voltage divider. When the current through the resistor 30 changes, the voltage on the collector 28 will change, therefore developing a pulsating negative voltage across the transistor 26. The emitter 27 is also provided with an emitter resistor 33 which is chosen so that the transistor will be biased in a conducting state under a no-signal condition. The presence of the diode 29 assures a condition that current will pass through the transistor base 25 and collector 28 to the power supply 23. The collector 28 of the transistor 26 is reversely biased and the diode 29 prevents a forward biasing of the transistor 26 from an unauthorized high current source on the collector 28 inasmuch as a high current source on the collector 28 would cause a forward bias and thereby damage the transistor 26. By means of this construction, it can be seen that the second transistorized network including the transistor 26 serves as a switching circuit. In other words, the amplified signal from the transistorized network, including the transistor 13 connected to the base 25 of the transistor 26 will create an off and on condition of the transistor 26, since the transistor is biased at the conducting state.

The common connection of the collector resistor 30 and the diode 29 in the collector circuit of the transistor 26 is connected to a conventional neon bulb 34, the other terminal of which is connected to the movable arm 35 of a set point potentiometer 36, having a D.C. ground. The potentiometer 36 is connected to a positive terminal of a 110 volt alternating current regulated power supply 37, the power supply 37 also having a D.C. ground.

The neon bulb 34 which is a gas type element, serves as a switching mechanism. The neon bulb 34 has an almost infinite resistance in an unionized state and a low resistance when energized. The collector voltage from the transistor 26 varies between a small negative pulsating D.C. potential to a larger negative pulsating D.C. potential, usually within the range of minus 2 volts to approximately minus 15 volts. This voltage exists at the left side of the neon bulb 34, reference being made to FIGURE 2. The power supply 37 provides a D.C. voltage and a reference voltage is taken from the potentiometer 36 which will add to the voltage on the left side of the neon bulb 34. The set point potentiometer 36 is designed to vary the voltage from the power supply 37 which is impressed across the neon bulb 34. Thus, if for example, a potential of 65 volts from the power supply was selected by means of the potentiometer 36 and a negative 10 volts was obtained from the collector of the transistor 26, an algebraic summation would provide approximately 75 volts, which is sufficient to light the neon bulb 34. The neon bulb 34 is of the type which will energize at approximately a 65 volt potential. The set point potentiometer 36 is provided with a screw type adjustment or similar conventional dial type of adjustment (not shown) and is also mounted on the housing 1. However, in order to avoid any unauthorized tampering with the adjustment thereof, the potentiometer regulating knob is recessed and is accessible only by means of removing a removable cover plate 38, which is retained by means of sheet metal screws 39.

The negative terminal of the power supply 37 is connected through a fixed sensitivity resistor 40 to an actuator relay coil 41, the opposite terminal of the coil 41 being grounded in the manner as illustrated in FIGURE 2. Connected in parallel with the resistor 40 and being operatively disposed in light receiving relationship to the neon bulb 34, is a cadmium sulfide light sensitive transducer 42. The transducer 42 is a resistive operating element and has a resistance which drops from approximately 1 megohm to approximately 100 ohms in the presence of direct light. The light sensitive transducer 42 therefore serves as a switching by-pass across the sensitivity resistor 40. Thus, by adding the transducer 42 in parallel with the resistor 40, a slight change in the resistance of the transducer 42 will create a substantially larger change of current available for the relay coil 41.

In effect, the resistor 40 increases the sensitivity of the transducer 42 since the transducer 42 is not sufficiently sensitive with respect to the neon bulb 34 to produce a sufficient current change in the coil 41 for creating an energized state in the coil 41.

The relay 41 operates the movable element 43 of a set of contacts 44 having a normally closed or unactuated position and a normally open or actuated position. The movable element 43 is connected to lugs 45 which are mounted on the exterior surface of the housing 1 and are capable of being connected to a 110 volt source of alternating current (not shown). One of the lugs 45 is provided with a floating ground. The normally open contact or energized contact 44 is connected through a current-limiting resistor 46 to one terminal of a neon bulb 47, the other terminal of which is provided with a floating ground. The neon bulb 47 serves as an indicator light and will be energized when the neon bulb 34 is energized. The resistor 46 serves as a current-limiting device to prevent over-energization of the bulb 47 in the presence of a large voltage. The normally open or de-energized contact 44 is connected to one center terminal of a double-pole double throw selector switch 48. The other center terminal of the double throw switch 48 is connected to the normally closed contact of the set of contacts 44. The positive lug 45 is connected to a first connector plug receptacle 49a and the opposite center terminal of the switch 48 is connected to a second connector plug receptacle 49b. A third connector plug receptacle 49c is connected to the floating ground of the indicator light 47, all in the manner as schematically illustrated in FIGURE 2. The opposite terminals of the switch 48 are connected to an external warning device 50, which is also provided with a floating ground. The housing 1 is provided on its exterior face with a set of lugs 50' for attachment to an external warning device 50 if it is desired to remotely locate the warning device 50 with respect to the apparatus A. The external warning device 50 may be in the form of a bell, a light or any other device capable of being energized upon receipt of an error signal. The two terminals on the upper portion of the switch 48, reference being made to FIGURE 2, are designated as the "under-load" position, and the terminals on the lower portion of the switch 48, FIGURE 2, are designated as the "over-load" position.

*Operation of the detector device*

In use, the detector apparatus A is suitably fastened or secured to or near an electric motor, pump or other device in which it is desired to detect changes in the input of such device. The device may be securely fastened by means of the bracket 2. As illustrated in FIGURES 1 and 2 the lugs 3 are connected in series to one of the input lines 4 to the electrical motor M. For purposes of illustrating the operation of the apparatus of the present invention, it may be assumed that the motor M operates a pump which receives an input fluid. It may also be assumed that it is desired to detect an under-load condition on the pump where less current would pass through the input conductor 4. The selector switch 48 is then shifted to the under-load position as illustrated in FIGURE 2.

By further reference to FIGURE 2, it can be seen that the transformer 6 serves as a sensing device which induces a current flow in the secondary coil 7 responsive to a change of current in the primary coil 5. The sensitivity potentiometer 9 is adjusted to the desired position for the horsepower requirements of the motor M. The coupling capacitor 11, as indicated above, is designed to pass A.C. current and block D.C. current. Moreover, if the potentiometer 8 were turned to the lowest level or eliminated from the circuit, there would be a tendency of current to drain from the base of the transistor 13 to the ground of the secondary coil 7 of the transformer 6 and this would in effect change the bias on the transistor 13. Furthermore, the capacitor 11 prevents a drain of power from the power supply 23. The first transistorized circuit serves as an amplifier and tends to increase the size of the signal produced by the secondary coil 7. The second transistorized circuit serves as a switching mechanism. When the transistor 26 is normally conducting, the resistance is low and hence voltage is low. However, the alternating voltage supplied to the base of the transistor 26 will cause the resistance to increase as current through the transistor 26 is reduced. This increased voltage will almost approximate the voltage from the power supply 23 when the transistor 26 is switched to the "off" condition. This switching condition will in effect change the negative voltage on the left side of the neon bulb 34, reference being made to FIGURE 2. By the corrective change in the signal the summation of the voltage may be sufficient or less than necessary to turn the neon bulb 34 off or on. When no load is present, then the relay coil 41 is de-energized and the neon bulb 34 would be off. The switch blade 43 would be in the position as illustrated in FIGURE 2, and a circuit would be completed to the external warning device 50. In other words, the external warning device 50 will always be actuated when the neon bulb 34 is in the off condition.

When current is passing through the conductor 4 to the motor M, a signal is generated in the primary coil 5 and hence, a signal is induced in the secondary coil 7. This signal is amplified through the transistorized circuit including the transistor 13 and transferred to the base 25 of the transistor 26. The set point potentiometer 8 is adjusted to a position where the minimum load condition is placed on the motor M to simulate the point at which energization of the external warning device 50 is desired. When the motor M is operating at a load greater than the minimum set point on the potentiometer 8, the signal will be transferred to the amplification portion of the circuit and to the transistor 26. This minimum voltage from the load conditions will maintain the transistor 26 in the off condition, thereby maintaining a high voltage on the collector 28. This high voltage in summation with the voltage from the power supply 37 will energize the light 34. As this occurs, the resistance of the light sensitive transducer 42 is reduced causing a shunting of the resistor 40. Current is then permitted to pass through the light sensitive transducer 42 directly to the relay coil 41 which will in turn cause the switch blade 43 to shift to the normally open or energized contact 44. At this point, it can be seen that the external warning device 50 is de-energized and in turn the signal light 47 is energized.

In the event that the load placed on the motor M is reduced below the set point voltage established by the potentiometer 8, the power from the amplification portion of the circuit to the base of the transistor 26 is not sufficient and the transistor 26 is de-energized, thereby decreasing the voltage on the collector 28 of the transistor 26. The reduction of this voltage would not be sufficient in additive effect with the voltage from the power supply 37 to maintain energization of the light 34. As the light 34 is de-energized, the resistance of the transducer 42 is increased, thereby eliminating the shunting effect of the resistor 40. This will in turn create de-energization of the relay coil 41 and de-energization of the indicator light 47. Furthermore, current will then flow to the external warning device 50, advising that an under-load condition exists on the motor M.

If on the other hand, it were desired to detect an over-load condition on the motor M, the arm of the double throw double pole selector switch 48 is then shifted to the over-load condition. In this position energization of the relay 41 would cause the movable switch blade 43 to switch to the normally open contact 44 causing energization of the indicator light 47. However, current is then transferred to the external warning device 50 causing energization thereof. If a load which produces a voltage less than that maintained by the set point potentiometer rate is detected, then the relay 41 will not be energized, thereby permitting the movable switch blade 43 to switch to the normally closed contact 44. This will create a condition of de-energization on the external warning device 50.

By means of the above outlined construction, it can be seen that a pair of detectors A can be connected to the input lines 4 of the motor M, thereby detecting both over-load and under-load conditions. The selector switch 48 of one of the detectors would be shifted to the under-load position and the selector switch 48 of the other detector would be shifted to the over-load condition. The desired range in which the motor M could operate without creating advisory signals due to under-load or over-load conditions would be determined by the set point maintained on the potentiometer 9 of each of the detector devices A.

*Detailed description of the automatic disconnect apparatus*

The detector apparatus A thus far described will only indicate when the motor M is operating under conditions which exceed or do not achieve the voltage position maintained on the set point potentiometer 9. However, this portion of the circuit will not automatically disconnect the motor upon sensing of either under-load or over-load conditions. Therefore, an automatic disconnect apparatus B substantially as illustrated in FIGURES 1 and 2, is shown for operative and optional attachment to the detector apparatus A.

The automatic disconnect apparatus B generally includes an outer housing 51 having a pair of upstanding brackets 52 for optional attachment to any suitable supporting structure. A series of three aligned lugs 53a, 53b and 53c are mounted on the underside of the housing 51 and are adapted to plug into each of the plug receptacles 49a, 49b and 49c respectively.

Connected to the plug 53a is a reset switch 54 which is normally biased to the open position, as illustrated in FIGURE 2. The open contact of the switch 54 is in turn connected to one terminal of a reset relay coil 55, the other terminal of which is provided with a floating ground. The common connection of the reset relay coil 55 and the open contact of the reset switch 54 is connected to the movable arm of a time-delay contact 56, the contact point of which is in turn connected to the plug 53a, through a normally closed switch 57. The time-delay switch 56 is operable by a time-delay relay coil 58, having one terminal provided with a floating ground and the other terminal of which is optionally connected to the plug 53a or the plug 53b through a switch 59. By reference to FIGURE 2, it can be seen that the switches 57 and 59 are "ganged" and operate in tandem. Moreover, it can be seen that the normally de-energized position of the movable arm to each of the switches 57 and 59 is in the upper position as illustrated in FIGURE 2, that is the position where the relay coil 58 is connected to the plug 53b. The switches 57 and 59 are operable by means of an actuating coil 60, having one terminal provided with a floating ground and the other terminal of which is connected to the plug 53a through a normally closed switch 61, the latter in turn being operable by means of the reset relay coil 55. Thus, when the reset relay coil 55 is energized such as by means of closing the reset switch 54, the switch 61 is shifted to the open position where the actuating relay coil 60 is de-energized and the switches 57 and 59 will open when the respective switch blades are shifted to the lower positions. When the relay coil 55 is de-energized, the switch 61 is shifted to the normally closed position and the switches 57 and 59 will shift to their upper positions as illustrated in FIGURE 2. As indicated above, the switch 54 is biased to the open position and normal closing thereof is only momentary.

Connected to the common connection of the switch 61 and the relay coil 60 is one terminal of a delayed external warning device 62, the other terminal of which is connected to the plug 53c and also to a floating ground in the manner as illustrated in FIGURE 2. Thus, it can be seen that when the switch 61 is in the closed position, a circuit is completed to the delayed external warning device 62 and when the switch 61 is opened, through actuation of the reset relay coil 55, the circuit to the delayed external warning device 62 is incomplete. The warning device 62 may be in the form of a bell, buzzer, or flashing light or any other type of advisory mechanism which is capable of advising of an undesirable condition. In this case, the warning device 62 is capable of advising of either over-load or under-load conditions on the motor M. It should be understood that the delayed external warning device 62 and the external warning device 50 may be located at some position remote from the apparatus A. Accordingly, the housing 51 is provided with a pair of outwardly extending lugs 63 for connection to the delayed external warning device 62.

A set of normally open contacts 64 is also operatively positioned to be actuable by the reset relay coil 55 and may be operated in tandem with the contacts 61. The contacts 64 are connected to a motor shut-off contact strip 65 which is provided with a pair of lugs 66, the latter being mounted on the upper wall of the housing 51 in the manner as illustrated in FIGURE 1. A 110 volt power source is connected in series with the switch blade of the contacts 64 and one terminal of the contact strip 65 in the manner as illustrated in FIGURE 2. Thus, it can be seen that when the reset relay coil 55 is in the de-energized position, the contacts 64 will be opened, thereby breaking a circuit to the lugs 66. When the reset relay coil 55 is energized, current will be supplied to the lugs 66. By further reference to FIGURE 2, it can be seen that the lugs 66 may be connected to a relay R which operates a main motor switch S. Generally, most motors are provided with a main switch S in the input lines for turning the motor off and on. This switch may be operable by a relay coil such as the coil R, which is in turn operated in a manner to be hereinafter described in detail.

It should be observed that the automatic disconnect apparatus can also be used in an alternative manner with 110 volt or 220 volt single phase operable motors in the manner as illustrated in FIGURE 3. In this particular case, the contacts 61 are connected directly to one of the input lines to the motor M in the manner as illustrated in FIGURE 3, thereby eliminating the need for the relay R and the switch S in the input lines to the motor M. However, it should be recognized that the apparatus A is capable of being used with almost any controllable device, having almost any desired input voltage.

*Operation of automatic disconnect apparatus*

When it is desired to use the automatic disconnect apparatus, the connector plugs 53a, 53b and 53c, which may be in the form of lugs, are inserted into the connector receptacles 49a, 49b and 49c respectively. The housing 51 may be secured either in the wiring system to the motor M, or to any convenient supporting structure by means of the brackets 52. It should be noted by reference to FIGURE 2, that the automatic disconnect apparatus B is provided with floating grounds and therefore the transistorized portion of the circuit is not grounded to the same elements as the automaic disconnect apparatus. For purposes of illustrating the operation of the automatic disconnect apparatus B in combination with the detector portion of the circuit, it may be assumed that the motor M is also connected to the lugs 3 in the manner as illustrated in FIGURE 2.

When the connector plugs 53a, 53b and 53c are inserted in the respective connector receptacles 49a, 49b and 49c, current will pass from the 110 volt source through the normally closed contacts 61 to the actuating relay coil 60. Energization of the coil 60 will cause the normally closed contact 57 to open and the normally open contact 59 to shift to the lower position, reference being made to FIGURE 2. As this occurs, a circuit is completed to the time delay relay coil 58. Energization of the coil 58 will cause the time delay contacts 56 to close, thereby completing a circuit to the reset relay coil 55. Energization of the relay coil 55 will cause the contacts 61 and 64 to shift to the lower positions. As the contacts 61 are opened, the current to the actuating coil 60 is eliminated, thereby de-energizing the coil 60. This will in turn break the circuit to the time delay relay coil 58. When the reset relay coil 55 was energized, the contacts 64 were closed, thereby completing a circuit to the relay coil R, maintaining completion of a circuit to the motor M and thereby permitting operation of the motor M. If after a period of time, nothing further is done, the contacts 56 will open, thereby breaking the circuit to the relay coil 55 and opening the contacts 64 which will in turn de-energize the relay R. This will thereupon permit the main switch S in the conductors 4 to open, breaking the circuit to the motor M.

After connecting the automatic disconnect apparatus, it may be assumed the selector switch 48 was shifted to the under-load position. If the motor M is maintained under load conditions, a signal is formed in the secondary coil 7 which will be amplified and transmitted to the neon light 34 in the manner as previously described. Under load conditions, the signal is sufficient to energize the neon light 34, thereby energizing the relay coil 41 in the manner as previously described. As the coil 41 is energized, the blade 43 will shift to the lower position, reference being made to FIGURE 2, thereby energizing the indicator light 47. However, as this occurs, the circuit to the external warning device 50 will be eliminated. Furthermore, the relay coil 55 will remain in the energized condition, thereby holding the contacts 64 in the closed position, permitting energization of the relay coil R. As this occurs, the switch S will remain closed, permitting the continued input of current to the motor M. It can be seen that the reset relay coil 55 will remain in the energized condition as long as a load is maintained on the motor M since current will pass through the selector switch 48, through the connector socket 49b, through the connector plug 53b, through the switch 59 and to the time delay relay coil 58. Energization of the coil 58 will keep the contacts 56 in a closed condition, thereby maintaining a circuit to the relay coil 55.

When the load on the output of the motor M is reduced, the current through the input lines 4 is also reduced. Consequently, there is a reduced signal in the secondary coil 7 of the transformer 6. This reduced signal, even when amplified, if below the set point voltage maintained on the potentiometer 36, will not be sufficient to energize the neon light 34. This will in turn deactivate the light sensitive transducer 42 and no longer permit current to by-pass the resistor 40. This condition will cause a de-energization of the relay coil 41 permitting the switch blade 43 to shift to its normal position, as illustrated in FIGURE 2. As this occurs, a circuit is completed to the external warning device 50, thereby energizing the same. Moreover, the circuit to the indicator light 47 will be de-energized. When the switch blade 43 shifted to the position as shown in FIGURE 2, a circuit to the time delay relay coil 58 is no longer completed. However, the time delay contacts 56 will remain closed for a pre-set period of time. For the purposes of the present invention a two minute pre-set period has been established. This will permit the continued energization of the reset relay coil 55, thereby maintaining the contacts 64 in a closed condition, in turn maintaining energization of the coil R for completion of the circuit to the motor M. However, if the load does not increase at least to the minimum load condition, the time delay relay coil 58 will not be re-energized and the time delay contacts 56 will open. This will permit a de-energization of the reset relay coil 55, thereby permitting the contacts 64 to open. As this occurs, the circuit to the relay coil R will be incomplete and the switch S will open and thereby de-energize the motor M. However, it should be observed that if the load on the motor M increased during the time that the time relay contacts 56 were closed, then the relay coil 58 would be energized and the circuit to the reset relay coil 55 would be maintained, thereby permitting continuance of the input current to the motor M.

Once the time delay contacts 56 open and the motor M is de-energized in the manner as previously described, it is only necessary to close the reset switch 54 which will in turn energize the reset relay coil 55. As this occurs, the contact 64 will again close and a circuit will be completed to the motor M.

It should also be observed that after the reset relay coil 55 is de-energized, the contact 61 will close, thereby completing the circuit to the actuating relay coil 60. This will in turn permit an energization of the time delay relay coil 58. It should also be observed that when the reset relay coil 55 is de-energized, the contacts 61 will close, thereby completing a circuit to the delayed external warning device 62. The delayed external warning device 62 will in turn advise of a condition where current is no longer being supplied to the motor M. Accordingly, when the external warning device 50 is first energized, this will provide sufficient time for the personnel to either turn the motor M off or increase the load condition to the motor M. If this is not done within the pre-set time limited by the time delay contacts 56, the motor M will shut off and the delayed external warning device 62 will be energized. It should additionaly be observed that after the reset relay switch 54 is closed, the motor M is again energized and will stay in the energized condition as long as a load is maintained on the motor M. If the load should again decrease below the set point voltage maintained by the potentiometer 36, the motor M will be de-energized after the pre-set time regulated by the time delay contacts 56.

The reverse of this operation will take place when the selector switch 48 is shifted to the over-load position. In this case, it can be seen by following the circuitry that the external warning device 50 will be energized only on overload conditions in the manner as previously described. Moreover, the over-load condition will energize the coil 41 permitting the switch blade 43 to shift to the lower contact position, reference being made to FIGURE 2. Again, it can be seen that the automatic disconnect apparatus B works in substantially the same manner, except that the motor M will be de-energized on the overload condition and the delayed external warning device 62 will be energized on the over-load conditions. If for some reason, it is desired to operate the motor M under under-load conditions or over-load conditions when the selector switch 48 is shifted to the under-load or over-load positions respectively, the reset switch 54 is held in a closed position. This will always maintain energization of the reset relay coil 55 and in turn complete a circuit to the motor M. This method of operating the motor M may be employed where it is desired to maintain the motor M in an energized condition, even through load requirements may not achieve at least the set point value on the potentiometer 36. It should also be observed that the apparatus A is "fail-safe" in that the breakdown of any of the components will cause a de-energization of the motor M.

*Example*

The invention is further illustrated by, but not limited to, the following example.

An apparatus A was constructed in accordance with the schematic wiring diagram of FIGURE 2 and operated under varying operating conditions in order to determine the various limitations of the apparatus. The transformer 6 was a step-up transformer with a two to seven turns ratio, the primary coil being constructed of a 16 gage enamel wire, and the secondary coil being constructed of a 24 gage enamel wire. A one-half inch iron core was employed. The neon bulbs 34 and 47 were miniature neon glow indicator lamps. The photo cell 42 was a cadmium sulfide photo cell produced by the General Electric Company, type No. B425. The photo cell was a 250 volt, 250 milliwatt device with a maximum current of 20 milliamperes. The silicon diodes 17 and 29 had a forward current of 100 milliamperes and a reverse current of 25 microamperes. The relay 41 was a Potter and Brumfield single pole double throw relay of 10 kilohms and 4.5 milliamperes, being commercially available under stock No. 75P774. The relay coil 55 was the same as the relay coil 41 except that the coil 55 was a double throw relay. The time delay relay coil 58 was an Amperite delay relay, normally opened for 120 seconds and commercially available under stock No. 115N0120. The relay coil 60 was similar to the relay coil 41 except that the coil 60 was a double pole double throw relay. The transistor 13 was a P.N.P. transistor of the R.C.A. Company available under stock No. 2N408. The transistor 26 was a Sylvania P.N.P. transistor available under stock No. 2N1265/5.

The remaining components used in the construction of the apparatus A are set forth in the following table.

| Component | Reference numeral | Characteristics |
|---|---|---|
| Capacitor | 11 | 40 microfarads, 10 volts D.C. |
| Do | 19 | 50 microfarads, 10 volts D.C. |
| Do | 24 | 20 microfarads, 25 volts D.C. |
| Potentiometer | 8 | 500 kilohms, one-half watt. |
| Do | 36 | 250 kilohms, one-half watt. |
| Resistor | 21 | 56 kilohms, one-half watt. |
| Do | 20 | 6.8 kilohms, one-half watt. |
| Do | 16 | 180 ohms, one-half watt. |
| Do | 22 | 5.6 kilohms, one-half watt. |
| Do | 32 | 68 kilohms, one-half watt. |
| Do | 31 | 22 kilohms, one-half watt. |
| Do | 33 | 68 ohms, one-half watt. |
| Do | 30 | 5.6 kilohms, one-half watt. |
| Do | 40 | 78 kilohms, one-half watt. |
| Do | 46 | 100 kilohms, one-half watt. |

The apparatus A was tested with a number of motors of various horsepower ranges, in order to determine the range of operability of the apparatus A. One of the devices used most often was a ⅓ horsepower motor from an electrical hand drill. It was determined that finger-tip control, that is the mere touching of the motor shaft, was sufficient to create load conditions on the motor for actuation of the apparatus A. The apparatus was submerged in an atmosphere of minus 6 degrees Fahrenheit for 25 minutes until all components achieved this temperature. The efficiency of the apparatus was reduced only very slightly. In order to determine the efficiency of the apparatus in a "life test," the apparatus was connected to a room heater for two days, where the heater turned off and on pursuant to changes in room temperature. On the average, the heater was on for approximately 5 minutes and off for approximately 15 to 30 minutes. In each case the apparatus was capable of sensing over-load conditions or conditions where the heater was operating and conditions when the heater was off. It was also determined that the apparatus A was very insensitive to changes in line voltage.

It was also attempted to by-pass the amplification stage of the circuit in order to determine if the signal at the secondary coil of the transformer 6 was sufficient to provide efficient operation. However, it was found that the results were inconsistent when amplification stage was by-passed. A signal was also applied from the secondary coil of the transformer 6 to a diode, which produced a series of negative pulses. These pulses were applied to the base of the transistor 26 in order to determine the effect on the apparatus A. However, the apparatus did not work since the voltage was insufficient in magnitude to change the bias of the transistor 26 sufficiently to energize the neon bulb 34. Furthermore, the amplification stage was eliminated and another transformer with a substantially larger turns ratio was substituted for the transformer 6. However, the voltage produced by the secondary coil was still not sufficient to provide efficient operation of the apparatus A.

The application of a negative voltage to the neon bulb 34 was also attempted. Theoretically, if the voltage at the transistor 26 is negative in the range of 5 volts and a negative voltage of 45 volts is applied to the neon bulb 34 from the power supply 37, the algebraic sum of the voltages would be a minus 50 volts. However, the apparatus did not work efficiently under these conditions since the voltage at the transistor 26 was more positive than the voltage applied to the neon bulb 34 by the power supply 37. Accordingly, a change of a few volts was needed to energize and de-energize the light 34 under this arrangement, which substantially reduced the efficiency of the apparatus. Many other tests were also performed by substitution of components and it was found that the apparatus schematically illustrated in FIGURE 2 produced very efficient operation.

Having thus described my invention, what I desire to claim and secure by Letters Patent is:

1. An apparatus for detecting changes in the power requirements of an electrically controllable element and providing corrective action when the output of said controllable element achieves a set point value, said apparatus comprising:
   (1) sensing means for sensing a change in the output of said controllable element,
   (2) amplification means for increasing the value of said change and providing a control signal,
   (3) advisory means for providing an informative signal when the output of the controllable element reaches the set point value,
   (4) power supply means for providing a reference voltage signal to said advisory means,
   (5) summating means interconnecting said power supply means and said amplification means for combining said control signal and said reference voltage signal,
   (6) and signal responsive switching means operatively connected across said power means and said advisory means and being operatively associated with said summating means, said switching means being actuable at the set point signal for transmitting the combined reference voltage signal and control signal to said advisory means thereby energizing said advisory means.

2. The apparatus of claim 1 wherein a sensitivity potentiometer is interposed between said sensing means and said amplification means for providing adaptation to a plurality of controllable elements having different input ranges.

3. The apparatus of claim 1 wherein the switching means includes a transistorized network for transmitting said control signal to said summating means when said control signal reaches a pre-set value, said summating means is a light emitting element capable of being energized at a minimum current level, and said signal responsive switching means is a light sensitive transducer capable of being actuated when said light emitting element is energized.

4. The apparatus of claim 3 further characterized in that a set point potentiometer is interposed between said power supply means and said light emitting element for adjusting the reference voltage signal to said light emitting element for obtaining a set point at which said light emitting element will be energized.

5. The apparatus of claim 3 further characterized in that:
   (a) the controllable element is an electric motor,
   (b) the input to the controllable element is the input electric power to said motor,
   (c) the output of the controllable element is the mechanical work performed by said motor,
   (d) and where a change in the output occurs through a load on said motor.

6. The apparatus of claim 3 further characterized in that the advisory means is adapted to provide an informative signal when the output of said controllable element is less than said set point value and wherein said signal responsive switching means is actuated at value less than said set point signal.

7. The apparatus of claim 3 further characterized in that the light emitting means is a neon bulb.

8. The apparatus of claim 3 further characterized in that a two position switching mechanism is operatively connected to said advisory means and said signal responsive switching means, the first position of said two position switching mechanism permitting said advisory means to provide an informative signal when the output of said controllable element is less than said set point value, and the second position of said two position switching mechanism permitting said advisory means to provide an informative signal when the output of said controllable element is greater than said set point value.

9. An apparatus for detecting the output requirements of an electrically controllable element and changing the input to said controllable element when the output thereof achieves a set point value, said apparatus comprising:
   (1) sensing means for sensing a change in the output of said controllable element,
   (2) amplification means for increasing the value of said change and providing a control signal,
   (3) error signal relaying means for providing an error signal when the output of the controllable element reaches the set point value thereby indicating a need for corrective action,
   (4) power supply means for providing a reference voltage signal to said error signal relaying means,
   (5) summating means interconnecting said power supply means and said amplification means for combining said control signal and said reference voltage signal,
   (6) signal responsive switching means operatively connected across said power supply means and said error signal relaying means and being operatively associated with said summating means, said switching means being actuable at the set point signal for transmitting the combined reference voltage signal and control signal to said error signal relaying means thereby energizing said error signal relaying means,
   (7) and automatic corrective means operatively connected to said error signal relaying means and the input of said controllable element for providing automatic operative disconnection of the input to the controllable element when the error signal relaying means transmits an error signal to said corrective means.

10. The apparatus of claim 9 further characterized in that a time delay means is operatively connected to said automatic corrective means for delaying the action of said corrective means for a predetermined interval after said error signal relaying means transmits an error signal to said automatic corrective means.

11. The apparatus of claim 9 further characterized in that a resetting means is operatively included in said corrective means for initiating the input to the corrective element after operative disconnection thereof.

12. The apparatus of claim 11 wherein the automatic corrective means, the time delay means and the resetting means are contained in a separate unit which is provided for operative attachment and disattachment to said apparatus.

13. An automatic disconnect apparatus adapted to be operatively connected to the input of a controllable element for operatively disconnecting the input to said element when the output thereof achieves a preselected set point value, said automatic disconnect apparatus comprising:
   (1) first relay means capable of being energized and closing a first set of contacts,
   (2) time delay relay means operatively connected to said first relay means and closing a set of time delay contacts after a preset period of time upon energization of said time delay relay means, (3) third relay means connected to said time delay contacts and being energizable when said time delay contacts close, said third relay means providing operative de-energization of said first relay means upon energization of said third relay means, (4) contact means maintaining input to said controllable element when said third relay means remains energized, (5) and switch means actuable by the output of said controllable element for maintaining energization of said time delay relay means and keeping said time delay contacts closed thereby maintaining energization of said third relay means and maintaining input to said controllable element if the input thereto has not achieved a set point value, said switch means being actuable by the output of said controllable element to operatively disconnect the input to said controllable element when the output thereof reaches the set point value.

14. The automatic disconnect apparatus of claim 13 wherein a reset switch is operatively connected to said third relay means for energizing said third relay after the input to said controllable element has been operatively disconnected and thereby reinstituting the input to said controllable element.

15. The automatic disconnect apparatus of claim 13 wherein said time delay relay operatively maintains the input to said controllable element for a preset period of time after the output of said controllable element achieves the set point value.

16. The method of detecting the power requirements of an electrically controllable element and providing corrective action when the output reaches a set point value, said method comprising:

(1) sensing the change in the output of said controllable element and producing a signal thereby, (2) amplifying the signal from the controllable element output, (3) transmitting said amplified signal to a radiation sensitive comparator and further transmitting said amplified signal if it exceeds a predetermined value, (4) combining said transmitted signal with a reference power signal thereby creating a control signal proportional to the output of said controllable element, (5) transmiting said control signal in response to actuation of said radiation sensitive comparator, (6) and creating an advisory signal from said control signal if said control signal exceeds another predetermined value.

17. The method of claim 16 wherein the input of said controllable element is operatively disconnected when the output thereof achieves said set point value.

18. An apparatus for detecting changes in the power requirements of an electrically controllable element and capable of providing a response thereto, when the power requirements to said controllable element achieve a set point value, said apparatus comprising:

(1) sensing means for sensing a change in the power requirements to said controllable element, (2) amplification means for increasing the value of said change and providing a control signal, (3) responsive means responding to said control signal and providing responsive action when the power requirements to the controllable element reach the set point value, (4) signal supply means for providing a reference signal to said responsive means, (5) summating means interconnecting said signal supply means and said amplification means for combining said control signal and said reference signal, (6) and signal responsive switching means operatively connected across said signal supply means and said responsive means and being operatively associated with said summating means, said switching means being actuable at the set point signal for transmitting the combined reference signal and control signal to said responsive means thereby energizing same.

19. An apparatus for detecting changes in the power requirements of an electrically controllable element and capable of providing a response thereto when the power requirements of said controllable element achieve a set point value, said apparatus comprising:

(1) sensing means for sensing a change in the power requirements to said controllable element and providing a control signal in response thereto, (2) control signal evaluation means including a radiation sensitive element and being operatively connected to said sensing means, said control signal evaluation means being actuable responsive to operation of said radiation sensitive element when said control signal reaches a preselected value, (3) responsive means responding to said control signal and providing responsive action when the power requirements to the controllable element reach the set point value, (4) and signal responsive switching means operatively associated with said responsive means and being operatively associated with said control signal evaluation means, said switching means being actuable at the set point signal for transmitting said control signal to said responsive means thereby energizing same.

20. The apparatus of claim 19 further characterized in that the control signal evaluation means includes a signal supply means for providing a reference signal and a summating means including said radiation sensitive element, said summating means being operatively connected to said sensing means and signal supply means for combining said control signal and reference signal, and that said signal responsive switching means is operatively connected to said summating means.

21. The apparatus of claim 20 further characterized in that an amplification means is operatively interposed between said sensing means and summating means for amplifying the signal from said sensing means.

22. An apparatus for detecting changes in the power requirements of an electrically controllable element and changing the power requirements to said controllable element in response to a conditional change on said controllable element, said apparatus comprising:

(1) sensing means for sensing a change in the power requirements to said controllable element and providing a control signal in response thereto, (2) control signal evalution means including a radiation sensitive element and being operatively connected to said sensing means, said control signal evaluation means being actuable responsive to operation of said radiation sensitive element when said control signal reaches a preselected value in response to the conditional change on said controllable element, (3) error signal relaying means operatively connected to said control signal evaluation means and providing an error signal when the control signal reaches said preselected value, (4) signal responsive switching means operatively associated with said error signal relaying means and being operatively associated with said control signal evaluation means, said switching means being capable of being actuated in response to said conditional change for transmitting the control signal to said error signal relaying means thereby causing actuation of said error signal relaying means, and (5) automatic corrective means operatively connected to said error signal relaying means and said controllable element for providing for automatic corrective action to the controllable element when the error signal relaying means transmits an error signal to said corrective means.

23. A condition responsive device comprising sensing means for sensing an external condition and producing a control signal in response thereto, switching means operatively connected to said sensing means and capable of transmitting said control signal, summating means including a radiation sensitive element and being operatively connected to said switching means and receiving said control signal, said summating means being actuable in response to operation of said radiation sensitive element and in response to receipt of a control signal, signal supply means operatively connected to said summating means and providing a reference signal for combining said control signal and reference signal at said summating means, and responsive means operatively connected to said summating means and being operable responsive to the combined signal.

24. The condition responsive device of claim 23 further characterized in that said summating means comprises a source of light and said radiation sensitive element comprises a light sensitive transducer which is energizable in response to the combined signal.

25. The condition responsive device of claim 24 further characterized in that said switching mechanism is a transistor having the collector thereof operatively connected to said light sensitive transducer.

26. An automatic disconnect apparatus adapted to be operatively connected to a controllable element for operatively disconnecting said controllable element from a power source in response to a conditional change on said controllable element, said automatic disconnect apparatus comprising:
  (1) first relay means capable of being energized and closing a first set of contacts,
  (2) time delay means operatively associated with said first relay means and closing a set of time delay contacts after a preset period of time upon energization of said time delay means,
  (3) second relay means operatively associated with said time delay means and being energizable when said time delay contacts close, said second relay means providing operative de-energization of said first relay means upon energization of said second relay means, and
  (4) contact means maintaining an operative connection of said power source and said controllable element in response to energization conditions of said second relay means.

27. The disconnect apparatus of claim 26 further characterized in that said apparatus is provided with switch means actuable by said controllable element for maintaining energization of said time delay contacts closed thereby maintaining energization of said second relay means and maintaining power to said controllable element if the conditional change thereto has not achieved a set point value, said switch means being actuable to operatively disconnect said controllable element from said power source when the conditional change thereon reaches the set point value.

28. A condition responsive apparatus for operatively disconnecting a controllable element from a power source in response to a condition on said controllable element, said apparatus comprising; first actuable means capable of being energized and causing an operative connection between said controllable element to said power source to energize said controllable element, time delay means operatively connected to said first actuable means and maintaining energization of the first actuable means for a preset period of time after a conditional change on said controllable element, and second actuable means energizable when said first actuable means is de-energized and being energized after the preset period of time.

29. The condition responsive apparatus of claim 28 further characterized in that said apparatus includes switch means actuable by said controllable element for maintaining actuation of said time delay means and maintaining power to said controllable element if the conditional change thereon has not achieved a set point value, said switch means being actuable to operatively disconnect said controllable element from said power source when the conditional change thereon reaches said set point value.

30. A system for controlling the energization of a gas filled light emitting device used in electronic apparatus and providing responsive action therefrom, said system comprising means for supplying an A.C. voltage signal, transistorized means for receiving said A.C. voltage signal and providing a pulsating D.C. voltage output, said light emitting device being connected to said transistorized means for receiving said pulsating D.C. voltage output, means for adding a D.C. voltage to said light emitting device voltage signal supply means operatively connected to said light emitting device and having a voltage signal additive with said D.C. voltage and said pulsating D.C. voltage output across said light emitting device, and means located to be responsive to energization and de-energization of said light emitting device.

31. The system of claim 30 further characterized in that said light emitting device is a neon bulb.

32. The method of detecting the power requirements of an electrically controllable element and providing responsive action when the power requirements reach a set point value, said method comprising:
  (1) electrically detecting the change in the power requirements to said electrically controllable element,
  (2) producing an input signal in response to the change in the power requirements on said controllable element,
  (3) transmitting said input signal to a radiation sensitive comparator and further transmitting said input signal if it exceeds a predetermined value,
  (4) combining said transmitted input signal with a reference signal thereby creating a control signal proportional to the power requirements on said controllable element,
  (5) transmitting said control signal in response to actuation of said radiation sensitive comparator, and
  (6) providing a responsive action from said control signal if said control signal exceeds another predetermined value.

References Cited

UNITED STATES PATENTS

| | | | |
|---|---|---|---|
| 3,020,413 | 2/1962 | Hamelink | 250—214 |
| 3,136,926 | 6/1964 | Smith | 317—130 |
| 3,214,640 | 10/1965 | Mills | 317—31 |
| 3,330,959 | 7/1967 | Willardson et al. | 250—214 |
| 3,336,510 | 8/1967 | Itoh | 317—124 |

JOHN F. COUCH, *Primary Examiner.*

J. D. TRAMMELL, *Assistant Examiner.*

U.S. Cl. X.R.

250—215; 317—22, 27, 33, 36, 130; 318—474